(12) United States Patent
Morimoto (10) Patent No.: US 10,927,528 B2
(45) Date of Patent: Feb. 23, 2021

(54) SHOVEL

(71) Applicant: SUMITOMO(S.H.I.) CONSTRUCTION MACHINERY CO., LTD., Tokyo (JP)

(72) Inventor: Takaaki Morimoto, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 316 days.

(21) Appl. No.: 15/919,481

(22) Filed: Mar. 13, 2018

(65) Prior Publication Data

US 2018/0202130 A1  Jul. 19, 2018

Related U.S. Application Data

(63) Continuation of application No. PCT/JP2016/077137, filed on Sep. 14, 2016.

(30) Foreign Application Priority Data

Sep. 15, 2015  (JP) .............................. JP2015-182160

(51) Int. Cl.
*E02F 9/26* (2006.01)
*H04N 7/18* (2006.01)
(Continued)

(52) U.S. Cl.
CPC ............ *E02F 9/261* (2013.01); *E02F 9/2004* (2013.01); *E02F 9/2029* (2013.01);
(Continued)

(58) Field of Classification Search
None
See application file for complete search history.

(56) References Cited

U.S. PATENT DOCUMENTS 5,854,988 A    12/1998  Davidson et al.
6,270,038 B1   8/2001   Cycon et al.
(Continued)

FOREIGN PATENT DOCUMENTS

DE    102014218749    3/2016
EP        2778293     9/2014
(Continued)

OTHER PUBLICATIONS

US 5,526,002 A, 06/1996, Gudat et al. (withdrawn)
(Continued)

*Primary Examiner* — Jonathan M Dager
*Assistant Examiner* — Garrett F Evans
(74) *Attorney, Agent, or Firm* — Ipusa, PLLC (57) ABSTRACT

A shovel includes a traveling undercarriage configured to travel, an upper rotating structure swingably mounted on the traveling undercarriage, a cab mounted on the upper rotating structure, an attachment including a working part configured to perform work, and a display device provided in the cab. The display device is configured to display an image including a work guidance display part, the work guidance display part showing an attitude of the working part and a target surface, and is configured to change a content displayed in the work guidance display part in accordance with an operating condition of the attachment.

19 Claims, 9 Drawing Sheets

(51) Int. Cl.
  *E02F 9/20*   (2006.01)
  *E02F 9/22*   (2006.01)
(52) U.S. Cl.
  CPC ............ *E02F 9/2285* (2013.01); *E02F 9/265* (2013.01); *H04N 7/181* (2013.01)

(56) References Cited

U.S. PATENT DOCUMENTS

| | | | |
|---|---|---|---|
| 6,744,372 | B1 | 6/2004 | Shaw et al. |
| 8,761,933 | B2 | 6/2014 | Oliver, III et al. |
| 8,824,779 | B1 | 9/2014 | Smyth |
| 9,157,216 | B2 | 10/2015 | Seki |
| 9,429,867 | B2 | 8/2016 | Suzuki et al. |
| 2003/0090384 | A1 | 5/2003 | Nishimura et al. |
| 2009/0009308 | A1* | 1/2009 | Date ............... B60R 1/00 340/439 |
| 2009/0040307 | A1 | 2/2009 | Rubin |
| 2011/0178677 | A1 | 7/2011 | Finley et al. |
| 2012/0029732 | A1 | 2/2012 | Meyer |
| 2012/0330500 | A1 | 12/2012 | Kamada et al. |
| 2013/0158797 | A1* | 6/2013 | Fukano ............. E02F 9/264 701/36 |
| 2014/0100712 | A1 | 4/2014 | Nomura et al. |
| 2014/0257645 | A1 | 9/2014 | Date |
| 2014/0267731 | A1 | 9/2014 | Izumikawa |
| 2014/0267775 | A1 | 9/2014 | Lablans |
| 2014/0271074 | A1 | 9/2014 | Ogawa |
| 2014/0297106 | A1 | 10/2014 | Magaki et al. |
| 2014/0350886 | A1 | 11/2014 | Metzler |
| 2014/0362220 | A1 | 12/2014 | Izumikawa et al. |
| 2015/0120126 | A1 | 4/2015 | So et al. |
| 2015/0269622 | A1 | 9/2015 | Kitagishi |
| 2016/0005286 | A1 | 1/2016 | Kiyota |
| 2016/0024757 | A1 | 1/2016 | Nomura et al. |
| 2016/0125666 | A1 | 5/2016 | Izumikawa et al. |
| 2016/0193920 | A1 | 7/2016 | Tsubone et al. |
| 2016/0258134 | A1 | 9/2016 | Matsumoto et al. |
| 2016/0305094 | A1* | 10/2016 | Chang ............... E02F 9/264 |
| 2016/0313736 | A1 | 10/2016 | Schultz et al. |
| 2017/0247107 | A1 | 8/2017 | Hauer et al. |
| 2017/0305018 | A1 | 10/2017 | Machida et al. |
| 2019/0150357 | A1 | 5/2019 | Wu et al. |
| 2019/0303982 | A1 | 10/2019 | Michel et al. |

FOREIGN PATENT DOCUMENTS

| | | |
|---|---|---|
| GB | 2533140 | 6/2016 |
| JP | S60-115972 | 6/1985 |
| JP | H08-506870 | 7/1996 |
| JP | H10-103925 | 4/1998 |
| JP | 2002-542116 | 12/2002 |
| JP | 2003-012278 | 1/2003 |
| JP | 2003-013471 | 1/2003 |
| JP | 2003-241833 | 8/2003 |
| JP | 2004-068433 | 3/2004 |
| JP | 2006-214246 | 8/2006 |
| JP | 2007-147588 | 6/2007 |
| JP | 2008-011193 | 1/2008 |
| JP | 2008-195142 | 8/2008 |
| JP | 2008-216660 | 9/2008 |
| JP | 2008-545324 | 12/2008 |
| JP | 2009-173195 | 8/2009 |
| JP | 2010-200398 | 9/2010 |
| JP | 2010-236208 | 10/2010 |
| JP | 2010-248777 | 11/2010 |
| JP | 2011-058269 | 3/2011 |
| JP | 2012-086348 | 5/2012 |
| JP | 2012-092500 | 5/2012 |
| JP | 2012-171024 | 9/2012 |
| JP | 2012-178912 | 9/2012 |
| JP | 2012-202063 | 10/2012 |
| JP | 2012-233404 | 11/2012 |
| JP | 2013-104236 | 5/2013 |
| JP | 2013-113044 | 6/2013 |
| JP | 2013-124467 | 6/2013 |
| JP | 2014-074315 | 4/2014 |
| JP | 2014-123304 | 7/2014 |
| JP | 2014-129676 | 7/2014 |
| JP | 2014-148893 | 8/2014 |
| JP | 2014-149621 | 8/2014 |
| JP | 2014-522053 | 8/2014 |
| JP | 2014-177784 | 9/2014 |
| JP | 2014-190089 | 10/2014 |
| JP | 2014-205955 | 10/2014 |
| JP | 2015-037937 | 2/2015 |
| JP | 2015-048025 | 3/2015 |
| JP | 2015-184376 | 10/2015 |
| JP | 2015-189036 | 11/2015 |
| JP | 2015-194069 | 11/2015 |
| WO | 2009/073052 | 6/2009 |
| WO | 2015/008655 | 1/2015 |
| WO | 2015/025439 | 2/2015 |
| WO | 2015/066531 | 5/2015 |
| WO | 2015/125979 | 8/2015 |
| WO | 2015/180180 | 12/2015 |
| WO | 2015/194601 | 12/2015 |

OTHER PUBLICATIONS

International Search Report for PCT/JP2017/003041 dated Feb. 28, 2017.

U.S. Office Action for U.S. Appl. No. 16/047,426 dated Nov. 15, 2019.

International Search Report for PCT/JP2016/077137 dated Dec. 6, 2016.

\* cited by examiner

// SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2016/077137, filed on Sep. 14, 2016 and designating the U.S., which claims priority to Japanese Patent Application No. 2015-182160, filed on Sep. 15, 2015. The entire contents of the foregoing applications are incorporated herein by reference.

BACKGROUND

Technical Field

The present invention relates to shovels.

Description of Related Art

An operator who operates a shovel serving as a construction machine is required to have expert operational skills to efficiently and accurately perform work such as excavation with an attachment. That being so, a shovel that has a function of guiding shovel operations (hereinafter referred to as "machine guidance function") to allow less experienced shovel operators to accurately perform work is known.

SUMMARY

According to an aspect of the present invention, a shovel includes a traveling undercarriage configured to travel, an upper rotating structure swingably mounted on the traveling undercarriage, a cab mounted on the upper rotating structure, an attachment including a working part configured to perform work, and a display device provided in the cab. The display device is configured to display an image including a work guidance display part, the work guidance display part showing an attitude of the working part and a target surface, and is configured to change a content displayed in the work guidance display part in accordance with an operating condition of the attachment.

DETAILED DESCRIPTION

According to shovels with the machine guidance function, for example, information such as a working condition is displayed, on the screen of a display device installed diagonally in front of a driver's seat. A shovel operator can check the working condition of the shovel from the information displayed on the display device.

The display device is limited in size so as not to hinder the vision of the operator. Accordingly, because the screen of the display device is reduced in size, the operator may be unable to obtain desired information unless gazing at the screen of the display device.

Furthermore, shovel operators normally perform operations while watching the teeth tips of a bucket or an excavation site positioned in front of the driver's seat, and therefore cannot look at the display device for a long time during operations. Accordingly, shovel operators can look at the display device for an extremely short time during operations, and may have difficulty in checking desired information from an image displayed on the display device within the time.

According to an embodiment of the present invention, a shovel that makes it possible to efficiently and accurately perform work while checking work information is provided.

Embodiments of the present invention are described below with reference to drawings. In the drawings, the same constituent parts are given the same reference character, and a repetitive description thereof may be omitted.

Figure 1:
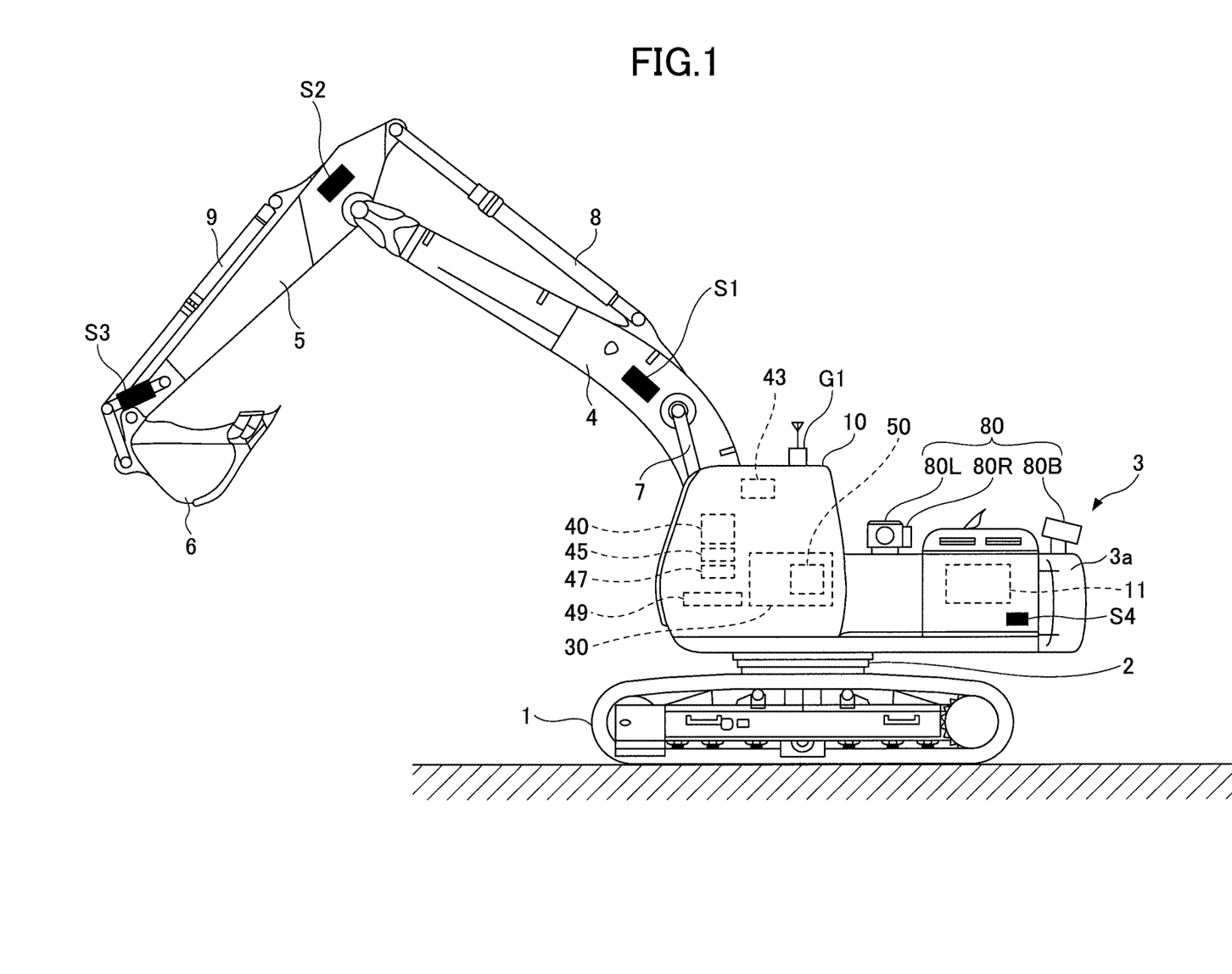
FIG. 1 is a side view illustrating a shovel according to an embodiment.

FIG. 1 is a side view illustrating a shovel according to an embodiment.

An upper rotating structure 3 is mounted on a traveling undercarriage 1 of the shovel via a swing mechanism 2. A boom 4 is attached to the upper rotating structure 3. An arm 5 is attached to an end of the boom 4. A bucket 6 serving as an end attachment (a working part) is attached to an end of the arm 5. A slope bucket, a dredging bucket, a breaker or the like may alternatively be attached as an end attachment.

The boom 4, the aim 5, and the bucket 6 form an excavation attachment as an example of an attachment, and are hydraulically driven by a boom cylinder 7, an arm cylinder 8, and a bucket cylinder 9, respectively. A boom angle sensor S1 is attached to the boom 4. An arm angle sensor S2 is attached to the arm 5. A bucket angle sensor S3 is attached to the bucket 6. A bucket tilt mechanism may be provided on the excavation attachment. The boom angle sensor S1, the arm angle sensor S2, and the bucket angle sensor S3 may be referred to as "attitude sensors."

The boom angle sensor S1 detects the rotation angle of the boom 4. For example, the boom angle sensor S1 is an acceleration sensor that detects the rotation angle of the boom 4 relative to the upper rotating structure 3 by detecting an inclination to a horizontal plane.

The arm angle sensor S2 detects the rotation angle of the arm 5. For example, the arm angle sensor S2 is an acceleration sensor that detects the rotation angle of the aim 5 relative to the boom 4 by detecting an inclination to a horizontal plane.

The bucket angle sensor S3 detects the rotation angle of the bucket 6. For example, the bucket angle sensor S3 is an acceleration sensor that detects the rotation angle of the bucket 6 relative to the arm 5 by detecting an inclination to a horizontal plane.

When the excavation attachment is provided with a bucket tilt mechanism, the bucket angle sensor S3 additionally detects the rotation angle of the bucket 6 about a tilt axis. The boom angle sensor S1, the arm angle sensor S2, and the bucket angle sensor S3 may alternatively be potentiometers using a variable resistor, stroke sensors that detect the stroke amount of a corresponding hydraulic cylinder, or rotary encoders that detect a rotation angle about a connecting pin.

Power sources such as an engine 11 and a body tilt sensor S4 are mounted on the upper rotating structure 3 and covered with a cover 3a. The body tilt sensor S4 detects the tilt angle of the upper rotating structure 3. For example, the body tilt sensor S4 is an acceleration sensor that detects the tilt angle of the upper rotating structure 3 by detecting an inclination to a horizontal plane.

An image capturing unit 80 is provided on top of the cover 3a. The image capturing unit 80 includes, facing a cabin 10 from the upper rotating structure 3, a left-side camera 80L that captures an image on the left side, a right-side camera 80R that captures an image on the right side, and a back-side camera 80B that captures an image on the back side. The left-side camera 80L, the right-side camera 80R, and the back-side camera 80B are, for example, digital cameras that contain an imaging device such as a CCD or CMOS, and transmit respective captured images to a display device 40 provided in the cabin 10.

The cabin 10, serving as a cab, is provided on the upper rotating structure 3. A GPS device (a GNSS receiver) G1 is provided on top of the cabin 10. The GPS device G1 detects the position of the shovel using a GPS function, and feeds position data to a machine guidance device 50 in a controller 30. The controller 30, the display device 40, an audio output device 43, an input device 45, and a storage device 47 are provided in the cabin 10.

The controller 30 operates as a main control part to control the driving of the shovel. The controller 30 is composed of a processing unit including a CPU and an internal memory. The CPU executes a program stored in the internal memory to implement various functions of the controller 30.

The controller 30 also operates as the machine guidance device 50 to guide shovel operations. For example, the machine guidance device 50 notifies an operator of work information such as the distance between a target surface (a work target surface) that is the surface of a target terrain set by the operator and the working part of the attachment. The distance between the target surface and the working part of the attachment is, for example, the distance between the target surface and the end (teeth tips) of the bucket 6 as an end attachment, the back surface of the bucket 6, the end of a breaker as an end attachment, or the like. The machine guidance device 50 notifies the operator of work information through the display device 40, the audio output device 43, etc., to guide shovel operations.

While the machine guidance device 50 is incorporated into the controller 30 according to this embodiment, the machine guidance device 50 and the controller 30 may alternatively be provided separately. In this case, like the controller 30, the machine guidance device 50 is composed of a processing unit including a CPU and an internal memory. The CPU executes a program stored in the internal memory to implement various functions of the machine guidance device 50.

The display device 40 displays an image including various kinds of work information in response to a command from the machine guidance device 50 included in the controller 30. The display device 40 is, for example, an in-vehicle liquid crystal display connected to the machine guidance device 50.

The audio output device 43 outputs various kinds of audio information in response to an audio output command from the machine guidance device 50 included in the controller 30. The audio output device 43 includes, for example, an in-vehicle speaker connected to the machine guidance device 50. The audio output device 43 may include an alarm such as a buzzer.

The input device 45 is a device for inputting various kinds of information to the controller 30 including the machine guidance device 50 by the operator of the shovel. The input device 45 includes, for example, a membrane switch provided on the surface of the display device 40. The input device 45 may include a touchscreen or the like.

The storage device 47 is a device for storing various kinds of information. The storage device 47 is, for example, a non-volatile storage medium such as a semiconductor memory. The storage device 47 stores various kinds of information output by the controller 30 including the machine guidance device 50, etc.

A gate lock lever 49 is a mechanism provided between the door and the driver's seat of the cabin 10 to prevent the shovel from being accidentally operated. When the operator climbs onto the driver's seat and pulls up the gate lock lever 49, the operator is prevented from getting out of the cabin 10 and various operation apparatuses become operable. When the operator pushes down the gate lock lever 49, the operator can get out of the cabin 10 and various operation apparatuses become inoperable.

Figure 2:
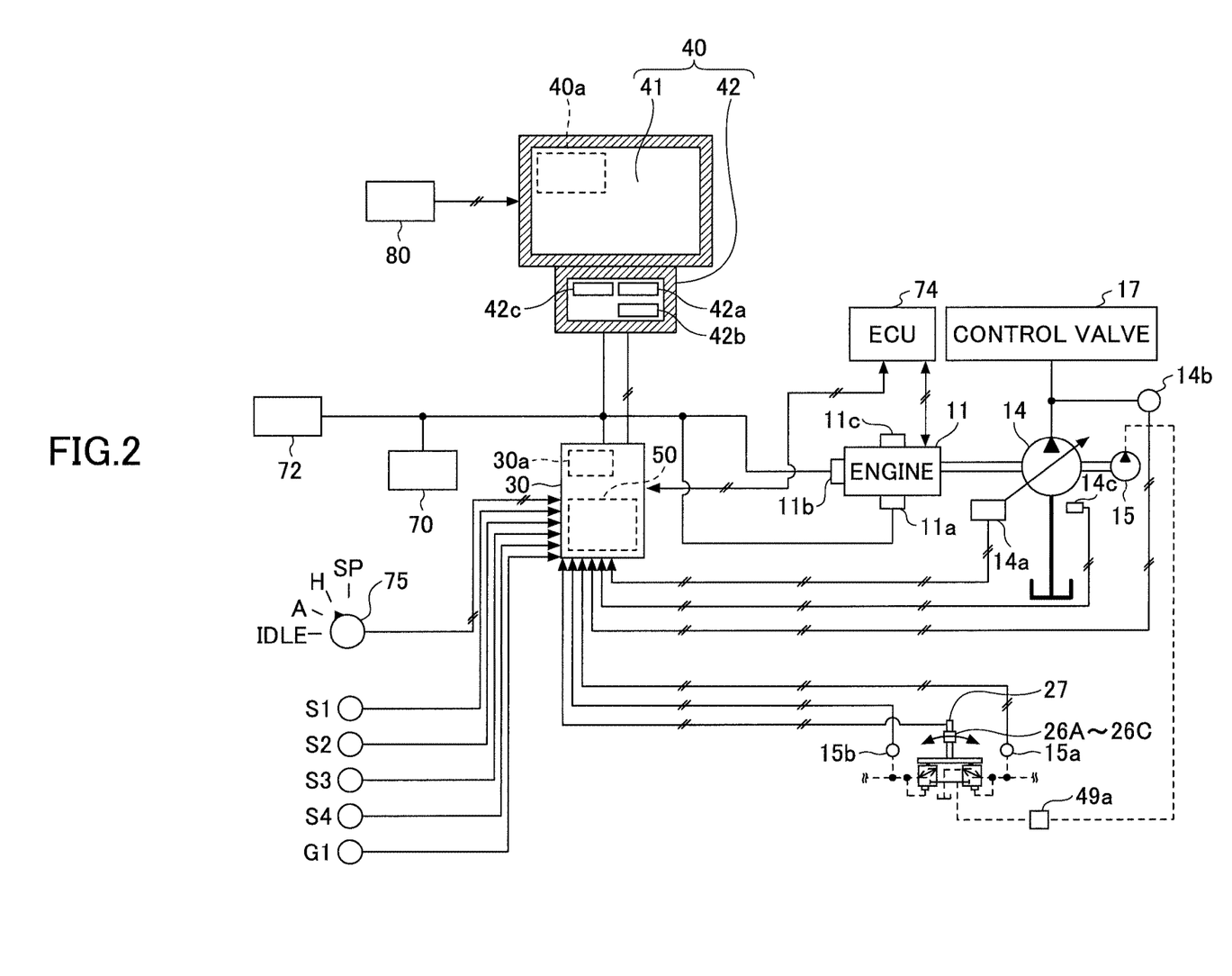
FIG. 2 is a diagram illustrating a configuration of connections including a controller of the shovel according to an embodiment.

FIG. 2 is a diagram illustrating a configuration of connections including the controller 30 of the shovel according to an embodiment.

The display device 40 is provided in the cabin 10 to display an image including work information fed from the machine guidance device 50, etc. The display device 40 is connected to the controller 30 including the machine guidance device 50 via a communications network such as a Controller Area Network (CAN) or a Local Interconnect Network (LIN), a dedicated line, etc.

The display device 40 includes a conversion part 40a to generate an image to be displayed on an image display part 41. The conversion part 40a generates an image including captured images to be displayed on the image display part 41, based on image data obtained from the image capturing unit 80. Image data are input to the display device 40 from each of the left-side camera 80L, the right-side camera 80R, and the back-side camera 80B.

Furthermore, the conversion part 40a converts, into an image signal, data to be displayed on the image display part 41 among various kinds of data input to the display device 40 from the controller 30. The data input to the display device 40 from the controller 30 include, for example, data indicating the temperature of engine coolant water, data indicating the temperature of hydraulic oil, data indicating the remaining amount of an aqueous urea solution, data indicating the remaining amount of fuel, etc.

The conversion part 40a outputs image signals after conversion to the image display part 41 to display an image generated based on captured images and various kinds of data on the image display part 41.

The conversion part 40a may be provided in not the display device 40 but, for example, the controller 30. In this case, the image capturing unit 80 is connected to the controller 30.

The display device 40 includes a switch panel 42 serving as an input part. The switch panel 42 is a panel including various kinds of hardware switches. The switch panel 42 includes a light switch 42a, a windshield wiper switch 42b, and a window washer switch 42c.

The light switch 42a is a switch for turning on and off lights attached to the exterior of the cabin 10. The windshield wiper switch 42b is a switch for moving and stopping a windshield wiper. The window washer switch 42c is a switch for spraying window washer fluid.

The display device 40 is supplied with electric power from a rechargeable battery 70 to operate. The rechargeable battery 70 is charged with electric power generated in an alternator 11a (generator) of the engine 11. The electric power of the rechargeable battery 70 is also supplied to electrical equipment 72, etc., of the shovel besides the controller 30 and the display device 40. Furthermore, a starter 11b of the engine 11 is driven with electric power from the rechargeable battery 70 to start the engine 11.

The engine 11 is connected to a main pump 14 and a pilot pump 15, and is controlled by an engine control unit (ECU) 74. Various data indicating the condition of the engine 11 (for example, data indicating coolant water temperature (a physical quantity) detected with a water temperature sensor 11c, etc.) are constantly transmitted from the ECU 74 to the controller 30. The controller 30 can store these data in an internal temporary storage part (memory) 30a and suitably transmit the data to the display device 40.

The main pump 14 is a hydraulic pump for supplying hydraulic oil to a control valve 17 via a high-pressure hydraulic line. The main pump 14 is, for example, a swash-plate variable displacement hydraulic pump.

The pilot pump 15 is a hydraulic pump for supplying hydraulic oil to various hydraulic control apparatuses via a pilot line. The pilot pump 15 is, for example, a fixed displacement hydraulic pump.

The control valve 17 is a hydraulic controller to control the hydraulic system of the shovel. For example, the control valve 17 selectively supplies hydraulic oil discharged by the main pump 14 to the boom cylinder 7, the arm cylinder 8, the bucket cylinder 9, traveling hydraulic motors, a swing hydraulic motor, etc. In the following, the boom cylinder 7, the aim cylinder 8, the bucket cylinder 9, the traveling hydraulic motors, and the swing hydraulic motor may be referred to as "hydraulic actuators."

Operation levers 26A through 26C are provided in the cabin 10 to be used by the operator to operate hydraulic actuators. When the operation levers 26A through 26C are operated, hydraulic oil is supplied from the pilot pump 15 to the pilot ports of flow control valves corresponding to hydraulic actuators. Each pilot port is supplied with hydraulic oil of a pressure commensurate with the direction of operation and the amount of operation of a corresponding one of the operation levers 26A through 26C.

According to this embodiment, the operation lever 26A is a boom operation lever. The operator can hydraulically drive the boom cylinder 7 to operate the boom 4 when operating the operation lever 26A. The operation lever 26B is an arm operation lever. The operator can hydraulically drive the arm cylinder 8 to operate the arm 5 when operating the operation lever 26B. The operation lever 26C is a bucket operation lever. The operator can hydraulically drive the bucket cylinder 9 to operate the bucket 6 when operating the operation lever 26C. Besides the operation levers 26A through 26C, operation levers, operation pedals, etc., for driving the traveling hydraulic motors, the swing hydraulic motor, etc., may be provided in the shovel.

The controller 30 obtains, for example, various kinds of data described below. The data obtained by the controller 30 are stored in the temporary storage part 30a.

A regulator 14a of the main pump 14, which is a variable displacement hydraulic pump, transmits data indicating a swash plate angle to the controller 30. Furthermore, a discharge pressure sensor 14b transmits data indicating the discharge pressure of the main pump 14 to the controller 30. These data (data representing physical quantities) are stored in the temporary storage part 30a. Furthermore, an oil temperature sensor 14c provided in a conduit between the main pump 14 and a tank storing hydraulic oil that the main pump 14 draws in transmits data representing the temperature of hydraulic oil flowing through the conduit to the controller 30.

Pressure sensors 15a and 15b detect a pilot pressure transmitted to the control valve 17 when the operation levers 26A through 26C are operated, and transmit data indicating the detected pilot pressure to the controller 30. The operation levers 26A through 26C are provided with a switch button 27. The operator can transmit a command signal to the controller 30 by operating the switch button 27 while operating the operation levers 26A through 26C.

An engine rotational speed adjustment dial 75 is provided in the cabin 10. The engine rotational speed adjustment dial 75 is a dial for adjusting the rotational speed of the engine 11, and, for example, can switch the engine rotation speed in a stepwise manner. According to this embodiment, the engine rotational speed adjustment dial 75 is provided to make it possible to switch the engine rotational speed among the four levels of SP mode, H mode, A mode, and idling mode. The engine rotational speed adjustment dial 75 transmits data indicating the setting of the engine rotational speed to the controller 30. FIG. 2 illustrates a state where the H mode is selected by the engine rotational speed adjustment dial 75.

The SP mode is a rotational speed mode selected when it is desired to prioritize workload, and uses the highest engine rotational speed. The H mode is a rotational speed mode selected when it is desired to satisfy both workload and fuel efficiency, and uses the second highest engine rotational speed. The A mode is a rotational speed mode selected when it is desired to operate the shovel with low noise while prioritizing fuel efficiency, and uses the third highest engine rotational speed. The idling mode is a rotational speed mode selected when it is desired to idle the engine 11, and uses the lowest engine rotational speed. The engine 11 is controlled to a constant rotational speed at the engine rotational speed of the rotational speed mode set by the engine rotational speed adjustment dial 75.

Figure 3:
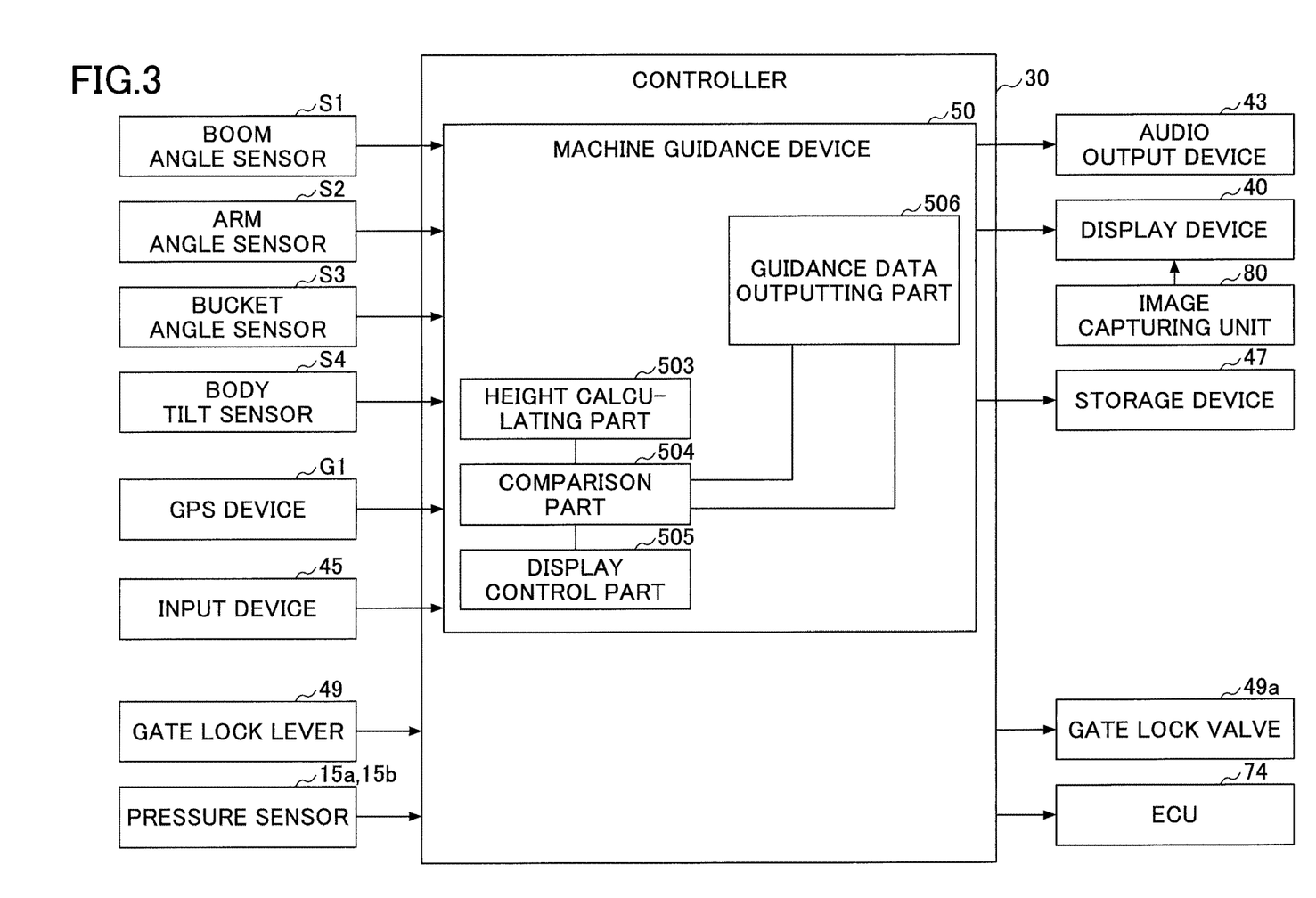
FIG. 3 is a diagram illustrating a configuration of the controller and a machine guidance device according to an embodiment.

Next, various functions provided in the controller 30 and the machine guidance device 50 of the shovel are described. FIG. 3 is a diagram illustrating a configuration of the controller 30 and the machine guidance device 50 according to an embodiment.

The controller 30 controls the entire shovel including the ECU 74. The controller 30 performs control to close a gate lock valve 49a when the gate lock lever 49 is pushed down and to open the gate lock valve 49a when the gate lock lever 49 is pulled up. The gate lock valve 49a is a selector valve provided in an oil passage between the control valve 17 and the operation levers 26A through 26C, etc. Here, the gate lock valve 49a is configured to be opened or closed based on a command from the controller 30. Alternatively, the gate lock valve 49a may be mechanically connected to the gate lock lever 49 to be opened or closed in response to the operation of the gate lock lever 49.

The gate lock valve 49a is closed to interrupt a flow of hydraulic oil between the control valve 17 and the operation levers 26A through 26C, etc., to disable the operation levers 26A through 26C, etc. The gate lock valve 49a is opened to allow passage of hydraulic oil between the control valve 17 and the operation levers 26A through 26C, etc., to enable the operation levers 26A through 26C, etc.

The controller 30 detects the amount of operation of each lever from a pilot pressure detected by the pressure sensor 15a or 15b with the gate lock valve 49a being opened to have the operation levers 26A through 26c enabled.

In addition to controlling the operation of the entire shovel, the controller 30 controls whether to give guidance by the machine guidance device 50. Specifically, in response to determining that the shovel is not working, the controller 30 transmits a guidance stop command to the machine guidance device 50 to stop guidance by the machine guidance device 50.

The controller 30 may output a guidance stop command to the machine guidance device 50 when outputting an automatic idling stop command to the ECU 74. Alternatively, the controller 30 may output a guidance stop command to the machine guidance device 50 in response to determining that the gate lock lever 49 is pushed down.

Next, the machine guidance device 50 is described. The machine guidance device 50 receives various signals and data supplied to the controller 30, from the boom angle sensor S1, the arm angle sensor S2, the bucket angle sensor S3, the body tilt sensor S4, the GPS device G1, the input device 45, etc.

The machine guidance device 50 calculates the actual operating position of the attachment such as the bucket 6 based on the received signals and data. Then, the machine guidance device 50 compares the actual operating position of the attachment and a target surface, and calculates, for example, the distance between the bucket 6 and the target surface. The machine guidance device 50 also calculates the distance from the swing center axis of the shovel to the teeth ends of the bucket 6, the inclination angle of the target surface, etc., and transmits these to the display device 40 as work information.

When the machine guidance device 50 and the controller 30 are provided separately, the machine guidance device 50 and the controller 30 are connected through CAN (Controller Area Network) to be able to communicate with each other.

The machine guidance device 50 includes a height calculating part 503, a comparison part 504, a display control part 505, and a guidance data outputting part 506.

The height calculating part 503 calculates the height of the end (teeth tips) of the bucket 6 from the angles of the boom 4, the aim 5, and the bucket 6 determined from the detection signals of the boom angle sensor S1, the arm angle sensor S2, and the bucket angle sensor S3.

The comparison part 504 compares the height of the end (teeth tips) of the bucket 6 calculated by the height calculating part 503 and the position of the target surface shown in the guidance data output by the guidance data outputting part 506. Furthermore, the comparison part 504 determines the inclination angle of the target surface relative to the shovel. Various kinds of data determined in the height calculating part 503 and the comparison part 504 are stored in the storage device 47.

The display control part 505 transmits the height of the bucket 6 and the inclination angle of the target surface, as determined by the comparison part 504, to the display device 40 as work information. The display device 40 displays the work information transmitted from the display control part 505, together with a captured image transmitted from the image capturing unit 80, on the screen. A display screen layout of the display device 40 is described below. Furthermore, in such cases where the bucket 6 is positioned lower than the target surface, the display control part 505 can issue an alarm to the operator through the audio output device 43.

Figure 4:
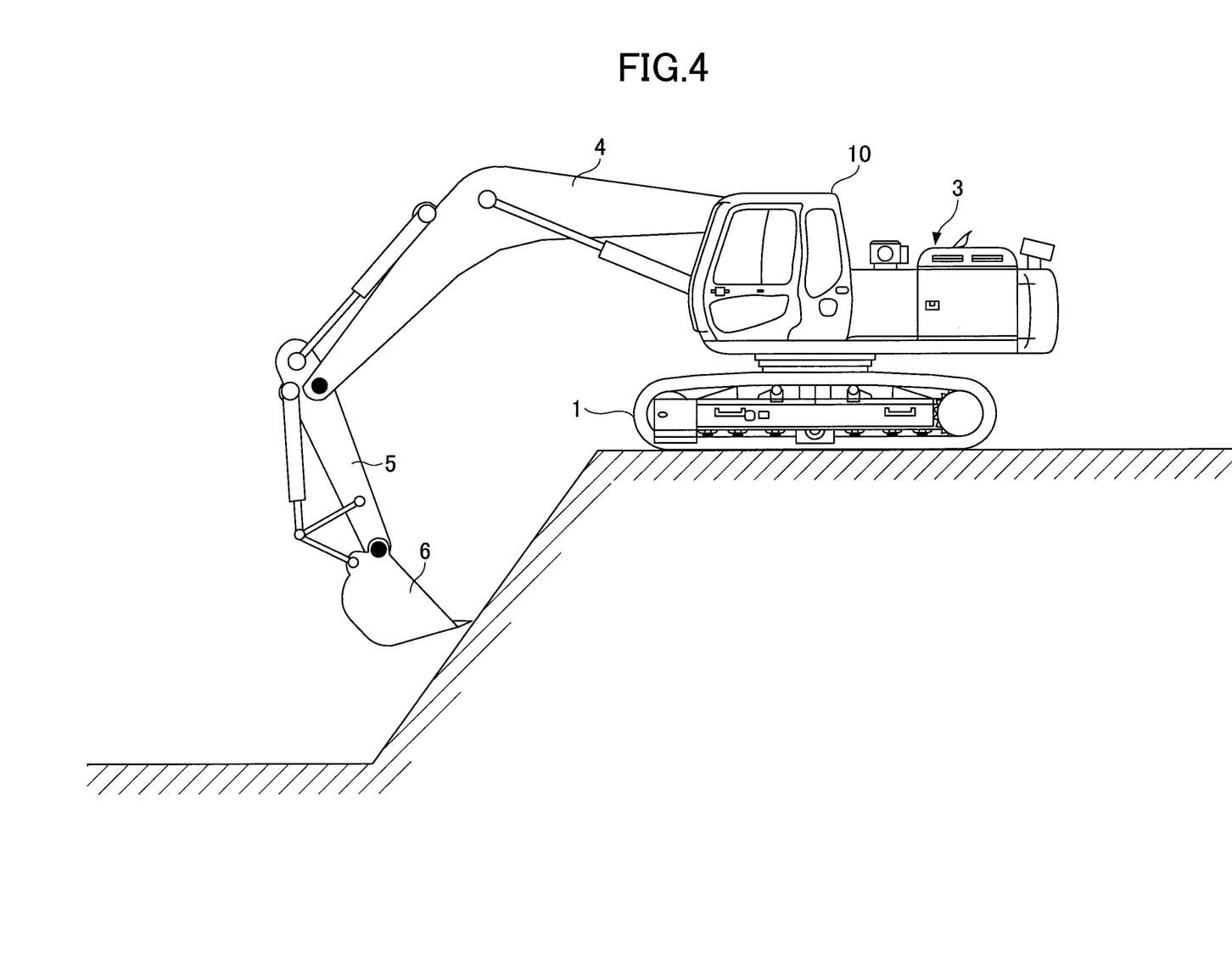
FIG. 4 is a diagram illustrating slope excavation work by the shovel according to an embodiment.
Figure 5:
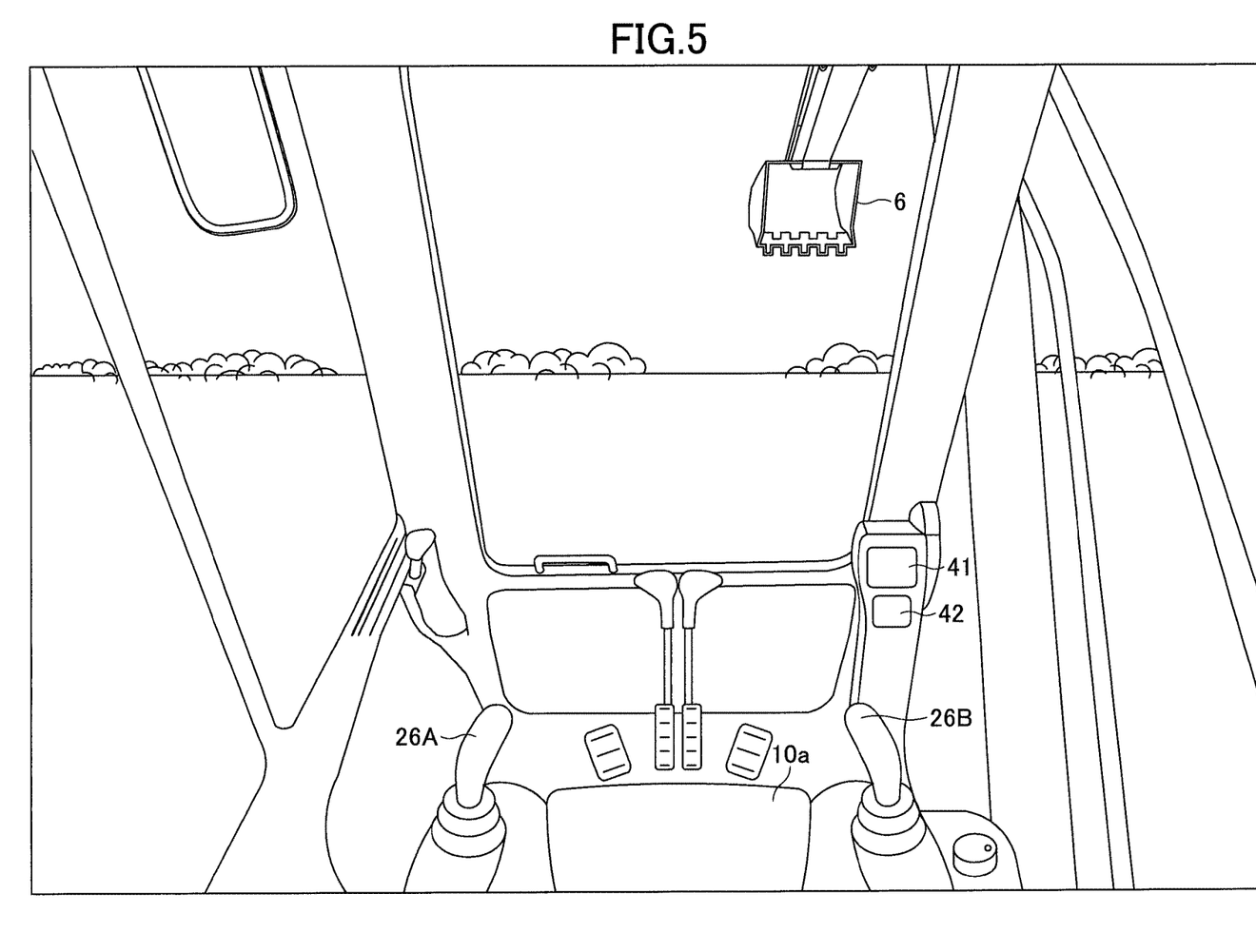
FIG. 5 is a diagram illustrating a forward looking view from a driver's seat in a cabin of the shovel according to an embodiment.

FIG. 4 is a diagram illustrating the shovel performing the work of excavating a slope (an inclined surface) with the bucket 6 according to an embodiment. FIG. 5 is a diagram illustrating a forward looking view from the driver's seat in the cabin 10 of the shovel according to an embodiment.

As illustrated in FIG. 5, the bucket 6 can be seen from the front window of the cabin 10. In the cabin 10, a driver's seat 10a is provided in the center, and the operation levers 26A and 26B are placed one on each side of the driver's seat 10a. The operator is seated on the driver's seat 10a and performs excavation work by moving the bucket 6 to a desired position by operating the operation lever 26A with the left hand and operating the operation lever 26B with the right hand.

The image display part 41 and the switch panel 42 of the display device 40 are placed on the front right of the driver's seat 10a (on the lower right of the front window). The operator of the shovel operates the operation levers 26A and 26B, etc., with both hands while looking at the bucket 6 outside the window, reading work information from the image display part 41 that comes into sight.

Here, the operator gazes at the bucket 6 outside the window during operations. Therefore, it is difficult for the operator to read the details of the information displayed on the image display part 41 that is in sight. Therefore, according to this embodiment, the contents displayed on the image display part 41 of the display device 40 are caused to differ between when the attachment is in operation and when the attachment is not in operation.

The controller 30 determines the presence or absence of an operation in the shovel based on the detection result of the pressure sensor 15a or 15b. For example, the controller 30 determines that the attachment is operating when any of the operation levers 26A through 26C is operated so that the pilot pressure detected by the pressure sensor 15a or 15b becomes or exceeds a predetermined value. Furthermore, the controller 30 determines that the attachment is non-operating when the pilot pressure detected by the pressure sensor 15a or 15b is less than a predetermined value.

Thus, the controller 30 determines the operating condition of the attachment from a pilot pressure detected by the pressure sensor 15a or 15b, and determines that the condition in which an operation of the attachment is absent is "non-operating." Furthermore, the controller 30 determines that the condition in which an operation of the attachment is present is "operating." The controller 30 transmits an operation signal indicating whether the attachment is non-operating or operating to the display device 40.

A criterion for determining the presence or absence of an operation by the controller 30 may be different from the above. The controller 30 may determine the operating condition of the attachment based on, for example, changes in the output signals of the boom angle sensor S1, the arm angle sensor S2, and the bucket angle sensor S3. Alternatively, for example, the controller 30 may determine that the condition in which either the arm 5 or the bucket 6 is operated is operating, and determine that the condition in which neither the arm 5 nor the bucket 6 is operated although the boom 4 is operated is non-operating. As yet another alternative, the controller 30 may determine the presence or absence of an operation in accordance with the condition of the gate lock lever 49.

The conversion part 40*a* of the display device 40 changes the contents displayed on the image display part 41 in accordance with the operation signal indicating the presence or absence of an operation transmitted from the controller 30. Specifically, the work information transmitted from the machine guidance device 50 is displayed in detail while an actuator is non-operating, and a display of contents such as work information is simplified while an actuator is operating.

Thus, according to this embodiment, the contents displayed on the image display part 41 of the display device 40 are caused to differ between when an operation is present in the shovel and when an operation is absent in the shovel, and by simplifying the contents displayed on the image display part 41 during operations, the operator is enabled to read necessary information even while performing operations.

Next, display screen layouts of the display device 40 are described.

Figure 6:
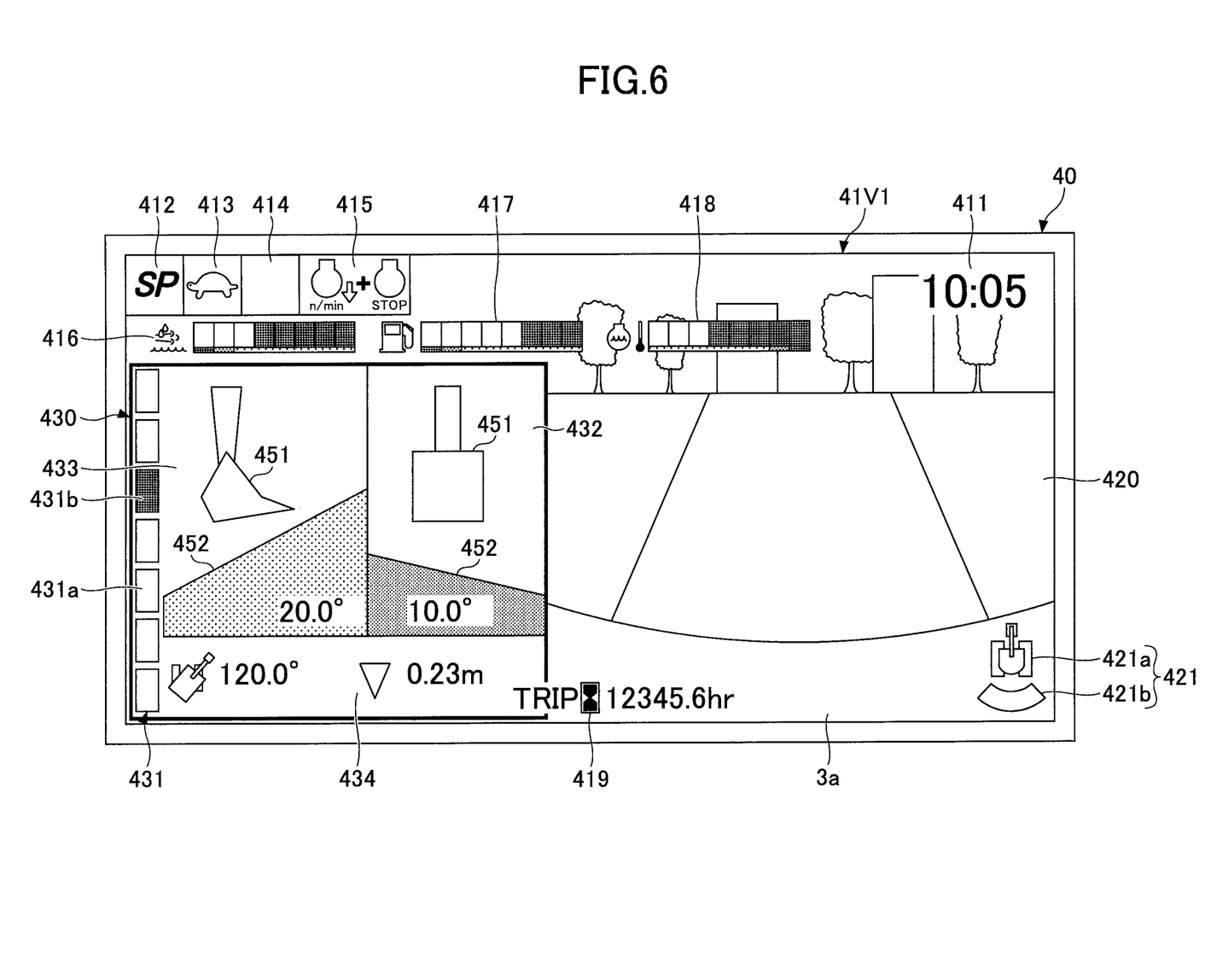
FIG. 6 is a diagram illustrating a non-operating-time screen of a display device according to an embodiment.

FIG. 6 is a diagram illustrating a non-operating-time screen 41V1 displayed on the image display part 41 of the display device 40 according to an embodiment.

As illustrated in FIG. 6, the non-operating-time screen 41V1 includes a time display part 411, a rotational speed mode display part 412, a traveling mode display part 413, an attachment display part 414, an engine control status display part 415, a remaining aqueous urea solution amount display part 416, a remaining fuel amount display part 417, a coolant water temperature display part 418, an engine operating time display part 419, a captured image display part 420, and a work guidance display part 430. The image displayed in each part is generated from various kinds of data transmitted from the controller 30 and captured images transmitted from the image capturing unit 80 by the conversion part 40*a* of the display device 40.

The time display part 411 displays a current time. In the illustration of FIG. 6, a digital display is employed, and a current time (10:05) is shown.

The rotational speed mode display part 412 displays a rotational speed mode set by the engine rotational speed adjustment dial 75 in an image. The rotational speed mode includes, for example, the above-described four modes, namely, SP mode, H mode, A mode, and idling mode. In the illustration of FIG. 6, a symbol "SP" representing SP mode is displayed.

The traveling mode display part 413 displays a traveling mode. The traveling mode represents the setting of traveling hydraulic motors using a variable displacement pump. For example, the traveling mode includes a low-speed mode and a high-speed mode. A "turtle"-shaped mark is displayed in the low-speed mode, and a "rabbit"-shaped mark is displayed in the high-speed mode. In the illustration of FIG. 6, the "turtle"-shaped mark is displayed to make it possible for the operator to recognize that the low-speed mode is set.

The attachment display part 414 displays an image representing an attachment that is attached. Various attachments such as the bucket 6, a rock drill, a grapple, and a lifting magnet are attached to the shovel. The attachment display part 414 displays, for example, marks shaped like these attachments and numbers corresponding to the attachments. According to this embodiment, the bucket 6 is attached as an end attachment, and as illustrated in FIG. 6, the attachment display part 414 is blank. When a rock drill is attached as an end attachment, for example, a rock drill-shaped mark is displayed together with a number representing the magnitude of the output of the rock drill.

The engine control status display part 415 displays the control status of the engine 11. In the illustration of FIG. 6, "automatic deceleration and automatic stop mode" is selected as the control status of the engine 11. The "automatic deceleration and automatic stop mode" means a control status to automatically reduce the engine rotational speed and further to automatically stop the engine 11 in accordance with the duration of a condition in which the engine load is low. Other control statuses of the engine 11 include "automatic deceleration mode," "automatic stop mode," "manual deceleration mode," etc.

The remaining aqueous urea solution amount display part 416 displays the status of the remaining amount of an aqueous urea solution stored in an aqueous urea solution tank in an image. In the illustration of FIG. 6, a bar graph representing a current status of the remaining amount of an aqueous urea solution is displayed. The remaining amount of an aqueous urea solution is displayed based on the output data of a remaining aqueous urea solution amount sensor provided in the aqueous urea solution water tank.

The remaining fuel amount display part 417 displays the status of the remaining amount of fuel stored in a fuel tank. In the illustration of FIG. 6, a bar graph representing a current status of the remaining amount of fuel is displayed. The remaining amount of fuel is displayed based on the output data of a remaining fuel amount sensor provided in the fuel tank.

The coolant water temperature display part 418 displays the temperature condition of engine coolant water. In the illustration of FIG. 6, a bar graph representing the temperature condition of engine coolant water is displayed. The temperature of engine coolant water is displayed based on the output data of the water temperature sensor 11*c* provided on the engine 11.

The engine operating time display part 419 displays the cumulative operating time of the engine 11. In the illustration of FIG. 6, a cumulative operating time since the restart of counting by the driver is displayed together with a unit "hr (hour)." A lifelong operating time in the entire period after the manufacture of the shovel or a section operating time since the restart of counting by the operator is displayed in the engine operating time display part 419.

The captured image display part 420 displays an image captured by the image capturing unit 80. In the illustration of FIG. 6, an image captured by the back-side camera 80B is displayed in the captured image display part 420. A captured image captured by the left-side camera 80L or the right-side camera 80R may also be displayed in the captured image display part 420. Furthermore, images captured by two or more of the back-side camera 80B, the left-side camera 80L, and the right-side camera 80R may also be displayed side by side in the captured image display part 420. Moreover, a bird's-eye view image into which captured images captured by the back-side camera 80B, the left-side camera 80L, and the right-side camera 80R, respectively, are combined may also be displayed in the captured image display part 420.

Each camera is so installed as to include part of the cover 3*a* of the upper rotating structure 3 in a captured image. The operator has a better sense of distance between an object displayed in the captured image display part 420 and the shovel because of inclusion of part of the cover 3*a* in a displayed image.

In the captured image display part 420, an image capturing unit icon 421 representing the orientation of the image capturing unit 80 that has captured a captured image that is being displayed is displayed. The image capturing unit icon 421 is composed of a shovel icon 421*a* representing the shape of the shovel in a plan view and a strip-shaped orientation indicator icon 421*b* representing the orientation of the image capturing unit 80 that has captured a captured image that is being displayed.

In the illustration of FIG. 6, the orientation indicator icon 421*b* is displayed below the shovel icon 421*a* (on the opposite side from the attachment) to indicate that a rear-view image of the shovel captured with the back-side camera 80B is displayed in the captured image display part 420. For example, when an image captured with the right-side camera 80R is displayed in the captured image display part 420, the orientation indicator icon 421*b* is displayed to the right of the shovel icon 421*a*. When an image captured with the left-side camera 80L is displayed in the captured image display part 420, the orientation indicator icon 421*b* is displayed to the left of the shovel icon 421*a*.

For example, the operator can switch an image to display in the captured image display part 420 to an image captured by another camera or the like by depressing an image change switch provided in the cabin 10.

If the shovel is not provided with the image capturing unit 80, different information may be displayed in place of the captured image display part 420.

The work guidance display part 430 includes a position indicator image 431, a first target surface display image 432, a second target surface display image 433, and a numerical value information image 434, and displays various kinds of work information.

The position indicator image 431 is a bar graph of vertically arranged bars 431*a*, and shows a distance from the working part of the attachment (for example, the end of the bucket 6) to a target surface. According to this embodiment, in accordance with the distance from the end of the bucket 6 to the target surface, one of the seven bars serves as a bucket position indicator bar 431*b* (the third bar from the top in FIG. 6) that is displayed in a color different from that of the other bars. Here, a point at the end of the working part in the left-to-right direction is preset as the position of the working part to be indicated in the position indicator image 431. The position of the working part to be indicated is, for example, the center, the left end, or the right end of the end of the working part. Furthermore, the position of the working part to be indicated may be changed as desired in the contents of work or at a work site. Furthermore, a relative distance between the back surface part of the working part and the target surface may be shown. The position indicator image 431 may include multiple images to be able to show the distance from the end of the bucket 6 to the target surface with more accuracy. For example, multiple bar graphs may be displayed to each show a relative distance between one of different points at the end of the working part in the left-to-right direction and the target surface. In this case, for example, a bar graph showing a relative distance between the left end of the end of the working part and the target surface and a bar graph showing a relative distance between the right end of the end of the working part and the target surface are displayed. The operator can understand the positional relationship between the working part and the target surface in more detail. Here, a central bar (a bar in the middle) among the bars 431*a* corresponds to the target surface. Therefore, a central bar (a bar in the middle) in a vertical direction (upward or downward direction in which the bars 431*a* are aligned in the position indicator image 431) alone may be different in color from the other bars. Thus, the target surface is set in a vertically central region of the bars 431*a*.

In a bar graph displayed in the position indicator image 431, for example, when the end of the bucket 6 is above the target surface, an upper bar is displayed in a color different from that of the other bars 431*a* as the bucket position indicator bar 431*b* in accordance with a distance from the target surface. Furthermore, when the end of the bucket 6 is below the target surface, a lower bar is likewise displayed in a color different from that of the other bars 431*a* as the bucket position indicator bar 431*b* in accordance with a distance from the target surface. Thus, the bucket position indicator bar 431*b* is displayed to move upward or downward in accordance with the position of the end of the bucket 6 relative to the target surface and the distance from the end of the bucket 6 to the target surface. The operator can determine the position of the end of the bucket 6 relative to the target surface and the distance from the end of the bucket 6 to the target surface by viewing the position indicator image 431.

The first target surface display image 432 schematically shows the relationship between the bucket 6 and the target surface. In the first target surface display image 432, the bucket 6 and the target surface in a forward looking view from the shovel that the operator has when seated in the cabin 10 are schematically displayed with a bucket icon 451 and a target surface 452. The bucket icon 451 is shown in the shape of the bucket 6 viewed from the cabin 10. The target surface 452 is displayed with the tilt angle of the bucket 6 relative to the actual target surface (10.0° in the illustration of FIG. 6). The interval between the bucket icon 451 and the target surface 452 is displayed to vary in accordance with the actual distance from the end of the bucket 6 to the target surface. Likewise, the tilt angle of the bucket 6 is displayed to vary in accordance with the positional relationship between the actual bucket 6 and target surface.

The operator can understand the positional relationship between the bucket 6 and the target surface and the inclination angle of the target surface by viewing the first target surface display image 432. In the first target surface display image 432, the target surface 452 may be displayed with an inclination angle that is greater than actually is to improve visibility for the operator. The operator can recognize an approximate inclination angle from the target surface 452 displayed in the first target surface display image 432. Furthermore, when the operator desires to know a precise inclination angle, the operator can know an actual inclination angle by viewing an inclination angle numerically displayed below the target surface 452.

The second target surface display image 433 schematically shows the relationship between the bucket 6 and the target surface viewed from the side. In the second target surface display image 433, the bucket icon 451 and the target surface 452 are displayed. The bucket icon 451 is shown in the shape of the bucket 6 viewed from the side. The target surface 452 is displayed with an inclination angle relative to a horizontal plane (20.0° in the illustration of FIG. 6). The interval between the bucket icon 451 and the target surface 452 is displayed to vary in accordance with the actual distance from the end of the bucket 6 to the target surface. The inclination angle is displayed to vary in accordance with the positional relationship between the actual bucket 6 and target surface.

The operator can understand the positional relationship between the bucket 6 and the target surface and the inclination angle of the target surface by viewing the second target surface display image 433. In the second target surface display image 433, the target surface 452 may be displayed with an inclination angle that is greater than actually is to improve visibility for the operator. The operator can recognize an approximate inclination angle from the target surface 452 displayed in the second target surface display image 433. Furthermore, when the operator desires to know a precise inclination angle, the operator can know an actual inclination angle by viewing an inclination angle numerically displayed below the target surface 452.

The numerical value information image 434 displays various kinds of numerical values indicating the positional relationship between the end of the bucket 6 and the target surface, etc. In the numerical value information image 434, the swing angle of the upper rotating structure 3 relative to a reference (120.0° in the illustration of FIG. 6) is displayed together with an icon showing a shovel. Furthermore, in the numerical value information image 434, the height of the end of the bucket 6 from the target surface (the vertical distance between the end of the bucket 6 and the target surface, which is 0.23 m in the illustration of FIG. 6) is displayed together with an icon showing the positional relationship with the target surface. In FIG. 6, the positional relationship between a preset part of the bucket, which is a working part, and the target surface is shown in a numerical value. When it is desired to show the positional relationship between each of the left and right ends of the blade edge or the back surface of the working part and the target surface in a numerical value, multiple combinations of an icon and numerical value information may be displayed side by side.

When an operation is absent in the shovel, the above-described non-operating-time screen 41V1 is displayed on the image display part 41 of the display device 40. The operator can specifically check, as numerical value information, the relative positional relationship between the bucket 6 and the target surface, etc., from various kinds of numerical values displayed in the numerical value information image 434. Numerical value information different from that described above may be displayed in the numerical value information image 434.

Figure 7:
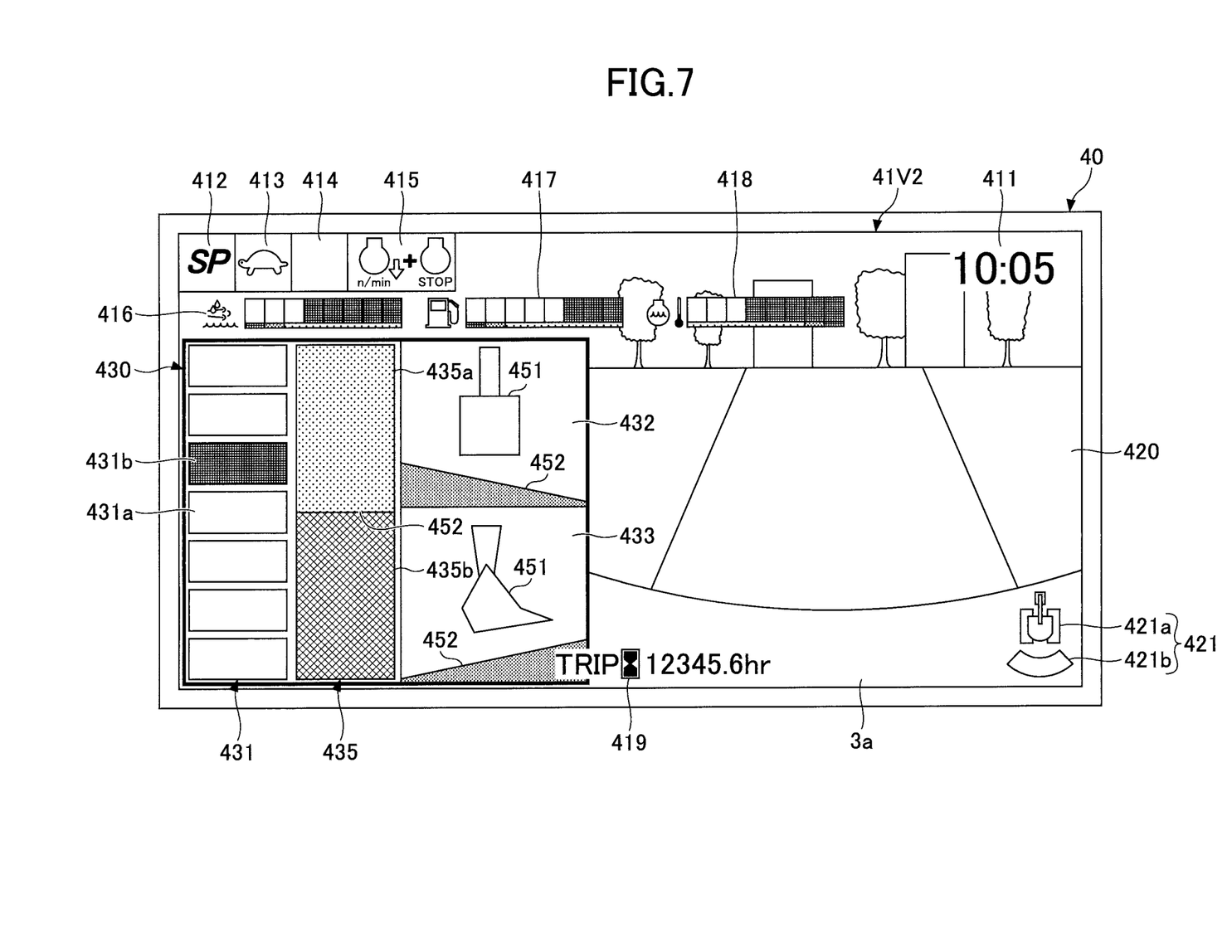
FIG. 7 is a diagram illustrating an operating-time screen of the display device according to an embodiment.

FIG. 7 is a diagram illustrating an operating-time screen 41V2 displayed on the image display part 41 of the display device 40 according to an embodiment.

When the attachment is operated by the operator, the controller 30 transmits a signal indicating the presence of an operation to the display device 40, and the operating-time screen 41V2 illustrated in FIG. 7 is displayed on the image display part 41 of the display device 40.

As illustrated in FIG. 7, like the non-operating-time screen 41V1, the operating-time screen 41V2 includes the time display part 411, the rotational speed mode display part 412, the traveling mode display part 413, the attachment display part 414, the engine control status display part 415, the remaining aqueous urea solution amount display part 416, the remaining fuel amount display part 417, the coolant water temperature display part 418, the engine operating time display part 419, the captured image display part 420, and the work guidance display part 430.

The non-operating-time screen 41V1 and the operating-time screen 41V2 are different in the configuration of the work guidance display part 430. The work guidance display part 430 of the operating-time screen 41V2 includes the position indicator image 431, the first target surface display image 432, the second target surface display image 433, and a target surface indicator image 435. In the operating-time screen 41V2, the position indicator image 431 is displayed larger and the first target surface display image 432 and the second target surface display image 433 are displayed smaller than in the non-operating-time screen 41V1. Furthermore, in the operating-time screen 41V2, the numerical value information image 434, which is displayed in the non-operating-time screen 41V1, is not displayed, and the target surface indicator image 435 is displayed.

According to the position indicator image 431 in the operating-time screen 41V2, the bars 431a in the non-operating-time screen 41V1 are enlarged and displayed. Furthermore, the target surface indicator image 435 is displayed next to and alongside the position indicator image 431. Thus, as a method of changing the contents displayed in the work guidance display part 430, the form of display of the position indicator image 431 changes, for example.

The target surface indicator image 435 is composed of, for example, two regions 435a and 435b that are displayed in different colors, and the boundary between the region 435a and the region 435b represents the position of the target surface 452. The target surface indicator image 435 may alternatively be composed of three or more regions that are displayed in different colors, and may have any boundary represent the position of the target surface 452.

According to this embodiment, in the target surface indicator image 435, the boundary between the region 435a and the region 435b representing the target surface 452 is formed at a position corresponding to the fourth bar 431a from the top in the position indicator image 431.

According to this configuration, when the end of the bucket 6 is above the target surface, in the position indicator image 431, one of the upper three bars is displayed in a color different from that of the other bars 431a as the bucket position indicator bar 431b in accordance with the distance between the end of the bucket 6 and the target surface. Furthermore, when the end of the bucket 6 is near the target surface, in the position indicator image 431, the fourth bar from the top (from the bottom) is displayed in a color different from that of the other bars 431a as the bucket position indicator bar 431b. Furthermore, when the end of the bucket 6 is below the target surface, in the position indicator image 431, one of the lower three bars is displayed in a color different from that of the other bars 431a as the bucket position indicator bar 431b in accordance with the distance between the end of the bucket 6 and the target surface.

Thus, in the operating-time screen 41V2, the position indicator image 431 becomes larger than in the non-operating-time screen 41V1 and is displayed together with the target surface indicator image 435. Therefore, the operator can easily understand the positional relationship between the end of the bucket 6 and the target surface while operating the bucket 6, without gazing at the operating-time screen 41V2 during operations. Accordingly, the operator can accurately perform work while checking the positional relationship between the end of the bucket 6 and the target surface.

Figure 8:
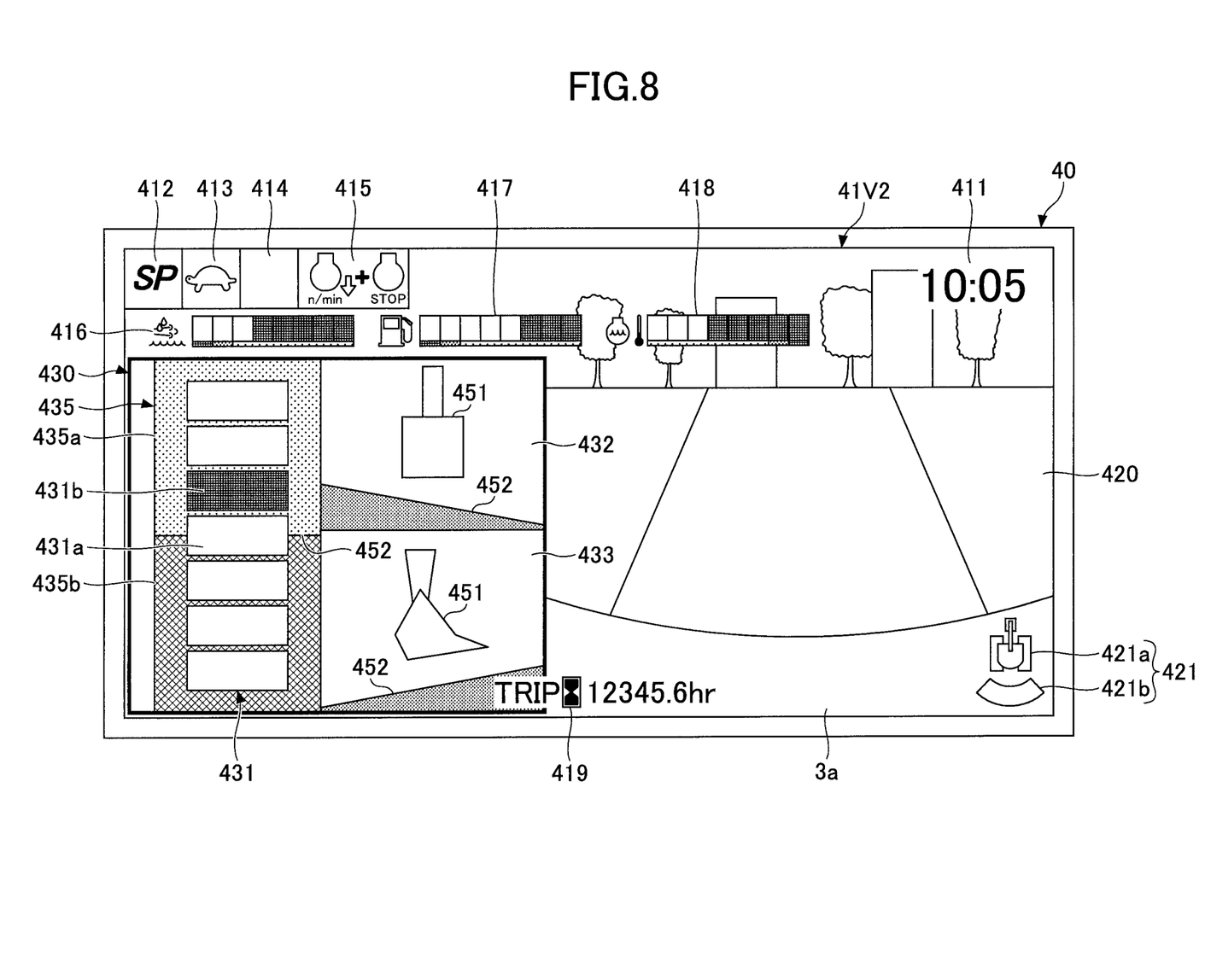
FIG. 8 is a diagram illustrating an operating-time screen of the display device according to an embodiment.
Figure 9:
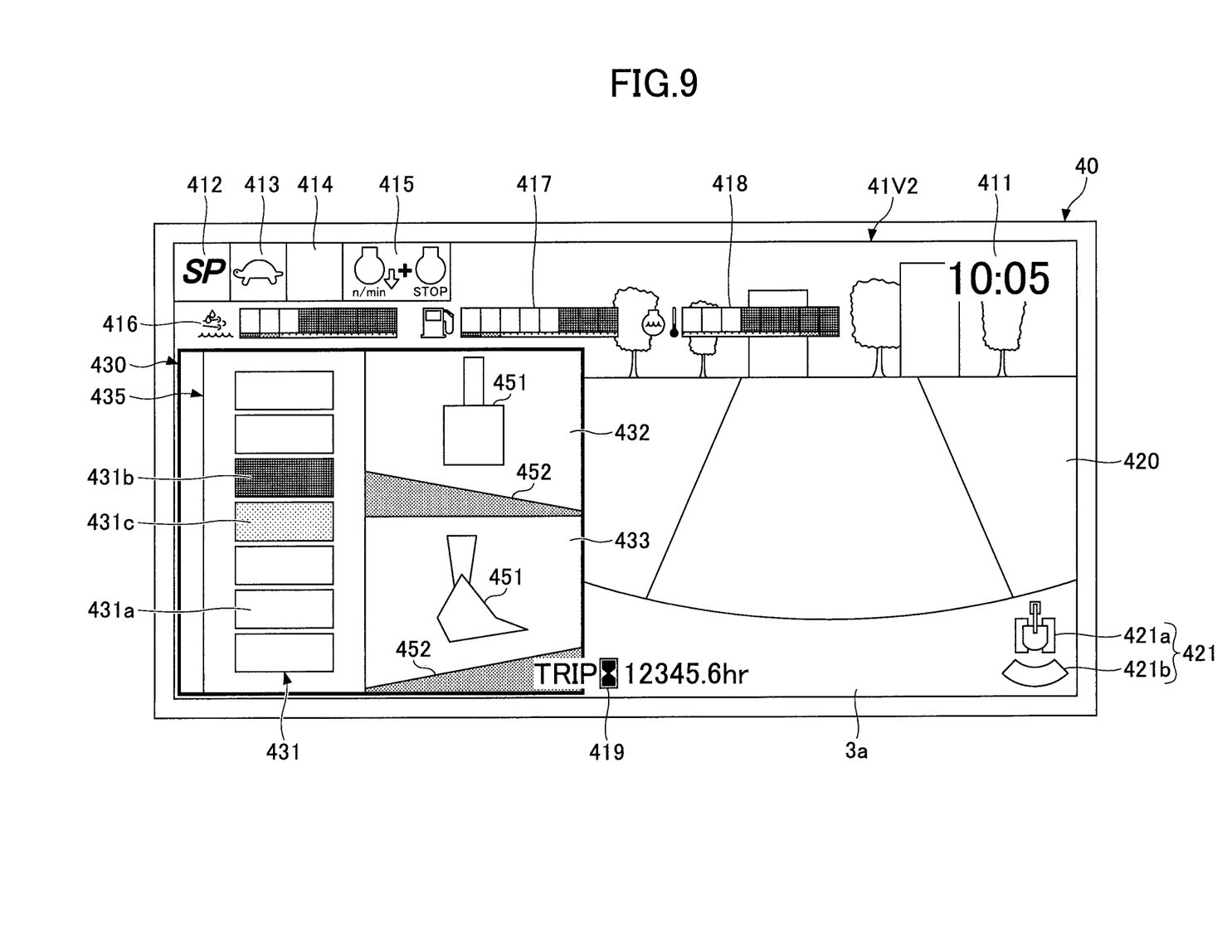
FIG. 9 is a diagram illustrating an operating-time screen of the display device according to an embodiment.

As illustrated in FIG. 8, the position indicator image 431 may be displayed over the target surface indicator image 435. A superimposed display of the position indicator image 431 and the target surface indicator image 435 makes it possible to more easily understand the positional relationship between the end of the bucket 6 and the target surface. Alternatively, as illustrated in FIG. 9, in the position indicator image 431, a bar indicating the vicinity of the target surface may be displayed in a color different from those of the bucket position indicator bar 431b and the other bars 431a as a target surface indicator bar 431c. Such display makes it possible to easily understand the positional relationship between the end of the bucket 6 and the target surface. In addition, for example, a display change switch may be provided in the cabin 10 to allow the operator to easily switch the display of the position indicator image 431 and the target surface indicator image 435 from FIG. 7 to the layout illustrated in FIG. 9. By properly switching to a display layout that is easy for the operator to see, it is possible to perform work with more accuracy. The color of the target surface indicator bar 431c may be the same as the color of the other bars 431a. In this case as well, the target surface is set in a vertically central region of the bars 431a.

In the work guidance display part 430 of the operating-time screen 41V2, the first target surface display image 432 and the second target surface display image 433 are displayed smaller than in the non-operating-time screen 41V1. In the first target surface display image 432 and the second target surface display image 433, a display of numerical values such as the inclination angle of the target surface and the distance from the swing center axis to the end of the bucket 6, which are displayed in the non-operating-time screen 41V1, is omitted.

For example, even if the above-described numerical values are displayed in the first target surface display image 432 and the second target surface display image 433, it is difficult for the operator, who cannot gaze at the operating-time screen 41V2 while operating the attachment, to check these numerical values. Therefore, a display of the above-described numerical values is omitted, and the first target surface display image 432 and the second target surface display image 433 are configured to show the relationship between the bucket icon 451 and the target surface 452 in a simplified manner.

The omission of numerical values improves the visibility of the first target surface display image 432 and the second target surface display image 433, thus making is possible for the operator to accurately perform work while checking the positional relationship between the bucket 6 and the target surface during operations.

Furthermore, in the first target surface display image 432 and the second target surface display image 433, the bucket icon 451 is displayed in a shape that is an exaggeration of the actual shape of the bucket 6. Furthermore, the target surface 452 is displayed with an inclination angle that is greater than actually is. As a result of thus displaying the relationship between the actual bucket 6 and target surface in an exaggerated manner, it becomes easier for the operator to check the relationship between the bucket 6 and the target surface during operations.

As described above, according to the shovel of this embodiment, the contents displayed on the image display part 41 of the display device 40 differ between when the attachment is operating and when the attachment is non-operating. At the operating time, the position indicator image 431 is larger than at the non-operating time and is displayed together with the target surface indicator image 435. Furthermore, various kinds of numerical values displayed at the non-operating time are not displayed at the operating time. Accordingly, the operator can easily understand the positional relationship between the bucket 6 and the target surface without gazing at the image display part 41 of the display device 40, and can accurately perform work while checking the positional relationship between the bucket 6 and the target surface.

In addition to those described above, the non-operating-time screen 41V1 and the operating-time screen 41V2 may include a fuel efficiency display part to display fuel efficiency and a hydraulic oil temperature display part to display the temperature condition of hydraulic oil in a hydraulic oil tank. The remaining aqueous urea solution amount display part 416, the remaining fuel amount display part 417, and the coolant water temperature display part 418, which are displayed in a bar graph in the illustrations of FIGS. 6 and 7, may alternatively be of needle display, and the form of display of the regions is not limited to what illustrated in this embodiment. Furthermore, the arrangement of the regions is not limited to the configuration illustrated in this embodiment.

A shovel according to embodiments is described above. The present invention, however, is not limited to the above-described embodiments, and variations and modifications may be made without departing from the scope of the present invention.

What is claimed is:
1. A shovel comprising:
a traveling undercarriage configured to travel;
an upper rotating structure swingably mounted on the traveling undercarriage;
a cab mounted on the upper rotating structure;
an attachment attached to the upper rotating structure and including a working part configured to perform work; and
a display device provided in the cab,
wherein the display device is configured to display an image including a work guidance display part, the work guidance display part showing an attitude of the working part and a target surface, and is configured to cause a content displayed in the work guidance display part to differ between when the attachment is in operation and when the attachment is not in operation.

2. A shovel comprising:
a traveling undercarriage configured to travel;
an upper rotating structure swingably mounted on the traveling undercarriage;
a cab mounted on the upper rotating structure;
an attachment including a working part configured to perform work; and
a display device provided in the cab,
wherein the display device is configured to display an image including a work guidance display part, the work guidance display part showing an attitude of the working part and a target surface, and is configured to change a content displayed in the work guidance display part in accordance with whether the attachment is in operation or not in operation, and
wherein the display device is configured to display a position indicator image showing a positional relationship between the working part and the target surface, the position indicator image being displayed larger when the attachment is in operation than when the attachment is not in operation.

3. The shovel as claimed in claim 2, wherein the display device is configured to display a target surface indicator image, together with the position indicator image, in the work guidance display part when the attachment is in operation, the target surface indicator image displaying a region indicating an upper side of the target surface and a region indicating a lower side of the target surface in different colors.

4. The shovel as claimed in claim 3, wherein the display device is configured to display the position indicator image over the target surface indicator image.

5. The shovel as claimed in claim 2, wherein the position indicator image shows a positional relationship between a point preset in the working part in a left-to-right direction and the target surface.

6. The shovel as claimed in claim 2, wherein the position indicator image includes a plurality of images each showing a positional relationship between one of different points preset in the working part in a left-to-right direction and the target surface.

7. The shovel as claimed in claim 2, wherein the target surface is set in a vertically central region of the position indicator image.

8. The shovel as claimed in claim 1, wherein the display device is configured to display numerical information regarding the work by the attachment in the work guidance display part when the attachment is not in operation, and is configured not to display the numerical information when the attachment is in operation.

9. The shovel as claimed in claim 1, further comprising:
an image capturing unit configured to capture an image of surroundings,
wherein the display device is configured to display an image including a captured image display part that displays the image captured by the image capturing unit.

10. The shovel as claimed in claim 1, wherein the display device is configured to display a setting of the shovel on an image display part irrespective of whether the attachment is in operation or not in operation.

11. The shovel as claimed in claim 1, wherein the display device is configured to display at least one of a status of a remaining amount of an aqueous urea solution stored in an aqueous urea solution water tank and a status of a remaining amount of fuel stored in a fuel tank on an image display part irrespective of whether the attachment is in operation or not in operation.

12. The shovel as claimed in claim 1, wherein the display device is configured to display a position indicator image at a left end of the work guidance display part.

13. The shovel as claimed in claim 1, wherein the display device is configured to display a first content in the work guidance display part when the attachment is in operation and display a second content in the work guidance display part when the attachment is not in operation, the first content being suited to when the attachment is in operation and the second content being suited to when the attachment is not in operation.

14. The shovel as claimed in claim 1, wherein the display device is configured to display the content in the work guidance display part in a more simplified manner when the attachment is in operation than when the attachment is not in operation.

15. The shovel as claimed in claim 14, wherein the display device is configured to display the content in the work guidance display part in the more simplified manner by at least one of enlarging a part of the content, exaggerating a part of the content, omitting a part of the content, and additionally displaying an indicator indicating a positional relationship between the working part and the target surface.

16. The shovel as claimed in claim 1, wherein the display device is configured to change a form of display of information included in the content displayed in the work guidance display part according to whether the attachment is in operation or not in operation.

17. The shovel as claimed in claim 1, wherein
the work guidance display part includes a plurality of images showing a positional relationship between the working part and the target surface, and
the display device is configured to cause a proportion between regions of the plurality of images to differ between when the attachment is in operation and when the attachment is not in operation.

18. The shovel as claimed in claim 1, wherein
the display device is configured to display one or more position indicator images showing a positional relationship between the working part and the target surface in the work guidance display part, and
a larger number of the one or more position indicator images is displayed when the attachment is in operation than when the attachment is not in operation.

19. The shovel as claimed in claim 1, wherein
the display device is configured to display one or more position indicator images showing a positional relationship between the working part and the target surface in the work guidance display part, and
the one or more position indicator images displayed when the attachment is in operation include a first region and a second region of different colors, and a boundary between the first region and the second region represents a position of the target surface.

* * * * *